US007836258B2

(12) United States Patent
Brown et al.

(10) Patent No.: US 7,836,258 B2
(45) Date of Patent: Nov. 16, 2010

(54) DYNAMIC DATA CACHE INVALIDATE WITH DATA DEPENDENT EXPIRATION

(75) Inventors: Jeffrey Douglas Brown, Rochester, MN (US); Russell Dean Hoover, Rochester, MN (US); Eric Oliver Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 11/559,090

(22) Filed: Nov. 13, 2006

(65) Prior Publication Data

US 2008/0114942 A1 May 15, 2008

(51) Int. Cl.
*G06F 13/00* (2006.01)
(52) U.S. Cl. .................. 711/134; 711/159; 345/557
(58) Field of Classification Search .................. 711/134, 711/159; 345/557
See application file for complete search history.

(56) References Cited

U.S. PATENT DOCUMENTS 5,379,394 A * 1/1995 Goto .......................... 710/305
6,115,794 A * 9/2000 Arimilli et al. ............... 711/141
2005/0091476 A1* 4/2005 Doing et al. ................. 712/227

OTHER PUBLICATIONS

Lee et al., Using cache Mechanisms to Exploit Nonrefreshing DRAM's for On-Chip Memories, Apr. 1991, IEEE Journal of Solid-State Circuits, vol. 26 No. 4, pp. 657-661.*

* cited by examiner

*Primary Examiner*—Brian R Peugh
*Assistant Examiner*—Jared I Rutz
(74) *Attorney, Agent, or Firm*—Patterson & Sheridan LLP

(57) ABSTRACT

According to embodiments of the invention, a distributed time base signal may be coupled to a memory directory which provides address translation for data located within a memory cache. The memory directory may have attribute bits which indicate whether or not the memory entries have been accessed by the distributed time base signal. Furthermore, the memory directory may have attribute bits which indicate whether or not a memory directory entry should be considered invalid after an access to the memory entry by the distributed time base signal. If the memory directory entry has been accessed by the distributed time base signal and the memory directory entry should be considered invalid after the access by the time base signal, any attempted address translation using the memory directory entry may cause a cache miss. The cache miss may initiate the retrieval of valid data from memory.

20 Claims, 13 Drawing Sheets

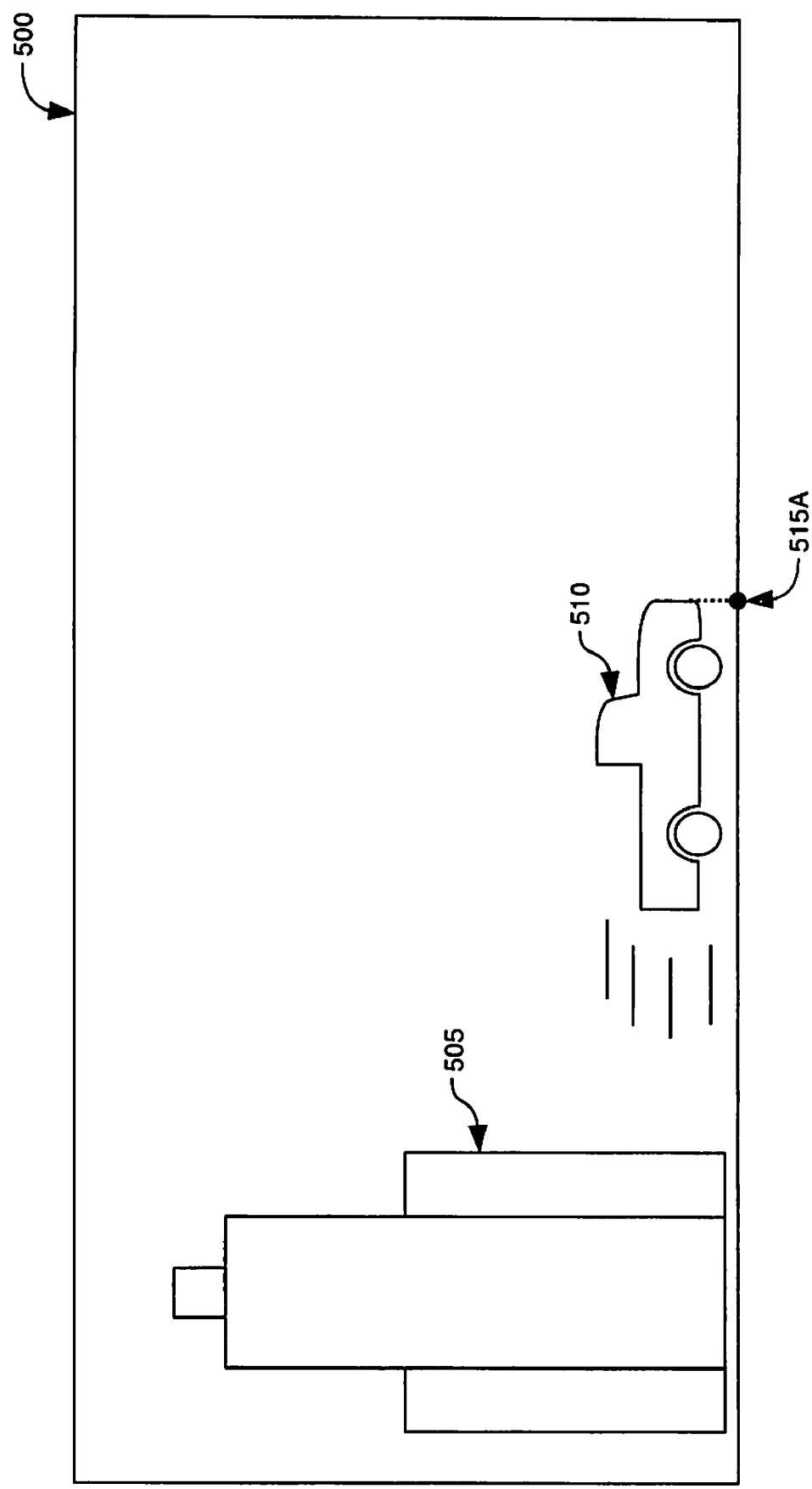

DYNAMIC DATA CACHE INVALIDATE WITH DATA DEPENDENT EXPIRATION

BACKGROUND OF THE INVENTION

1. Field of the Invention

Embodiments of the invention generally relate to the field of computer processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method of invalidating data in a memory cache is provided. The method generally comprising: creating a first memory directory entry corresponding to a first portion of the memory cache and a second memory directory entry corresponding to a second portion of the memory cache, wherein the memory directory entries provide effective address to real address translation for the data in the memory cache; setting a first bit in the first memory directory entry to indicate the first memory directory entry is invalid upon the reception of a distributed time base signal; generating the distributed time base signal; setting a second bit in the first and second memory directory entries in response to the distributed time base signal; receiving a request for memory address translation for the first portion of the memory cache; and determining the first memory directory entry is invalid by examining the first bit and the second bit in the first memory directory entry.

According to another embodiment of the invention a computer readable medium is provided which, when executed, performs an operation. The operation generally comprising: creating a first memory directory entry corresponding to a first portion of a memory cache and a second memory directory entry corresponding to a second portion of the memory cache, wherein the memory directory entries provide effective address to real address translation for the data in the memory cache; setting a first bit in the first memory directory entry to indicate the first memory directory entry is invalid upon the reception of a distributed time base signal; generating the distributed time base signal; setting a second bit in the first and second memory directory entries in response to the distributed time base signal; receiving a request for memory address translation for the first portion of the memory cache; and determining the first memory directory entry is invalid by examining the first bit and the second bit in the first memory directory entry.

According to another embodiment of the invention a system is provided. The system generally comprising: a frame refresh timer circuit coupled to a first processing element, wherein the frame refresh timer circuit is configured to generate a periodic distributed time base signal; a memory cache comprising at least a first portion and a second portion; a memory directory comprising at least a first directory entry which provides effective address to real address translation for data within the first portion of the memory cache and a second directory entry which provides effective address to real address translation for data within the second portion of the memory cache; and wherein the processing element is configured to: set an invalidate memory entry on distributed time base signal bit in the first directory entry; set a received distributed time base signal bit in at least the first directory entry and the second directory entry upon a reception of the distributed time base signal; receive a request for memory address translation for data located in the first portion of the memory cache; and determine the first memory directory entry is invalid by comparing the invalidate memory entry on distributed time base signal bit with the received distributed time base signal bit.

BRIEF DESCRIPTION OF THE DRAWINGS

FIGS. 5 and 8 illustrate a three dimensional scene to be rendered by an image processing system, according to one embodiment of the invention.

DETAILED DESCRIPTION OF THE PREFERRED EMBODIMENTS

Figure 1:
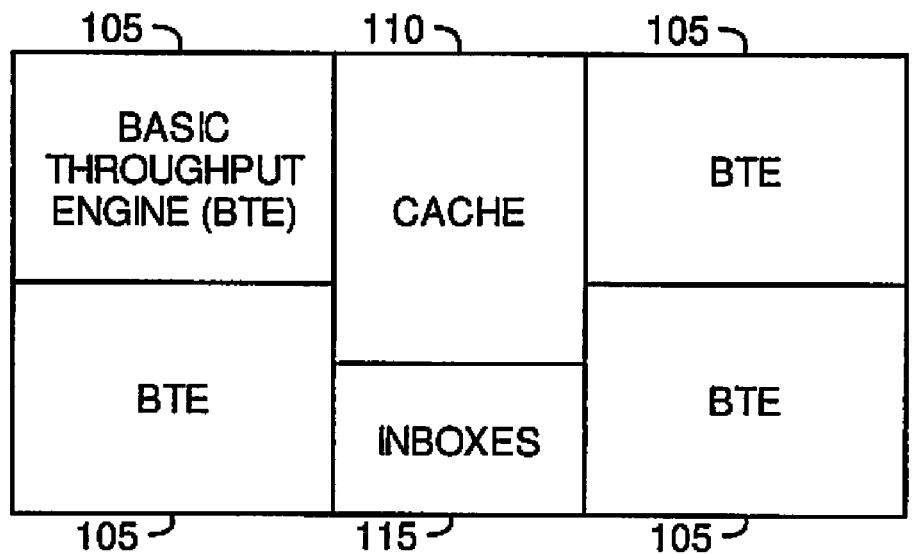
FIG. 1 illustrates a multiple core processing element, according to one embodiment of the invention.

Embodiments of the invention provide methods and apparatus for invalidating select portions of a memory cache while maintaining the validity of other portions of the memory cache. According to one embodiment of the invention, a distributed time base signal in conjunction with attribute bits in a memory directory may be used to invalidate select portions of the memory cache. The distributed time base signal may be coupled to entries within the memory directory. Upon a distribution of the time base signal, an attribute bit in the memory directory entries may be set which indicates that the memory directory entries were accessed by the distributed time base signal. Furthermore, the memory directory entries may also contain an invalidation attribute bit which, if set, indicates that the memory directory entry should be considered invalid upon the reception of the next distributed time base signal. If the invalidation attribute bit in a memory directory entry is set and the memory directory entry has been accessed, any subsequent requests for address translations through the memory directory entry may cause a cache miss. The cache miss may cause a processing element to fetch valid data from memory and replace data within the memory cache. Thus, through the use of the distributed time base signal and the attribute bits in the memory directory entry, the portion of the memory cache to which a memory directory entry provided address translation is effectively invalidated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Processor Layout and Communications Network

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index, as described further below with regards to FIG. 4, may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
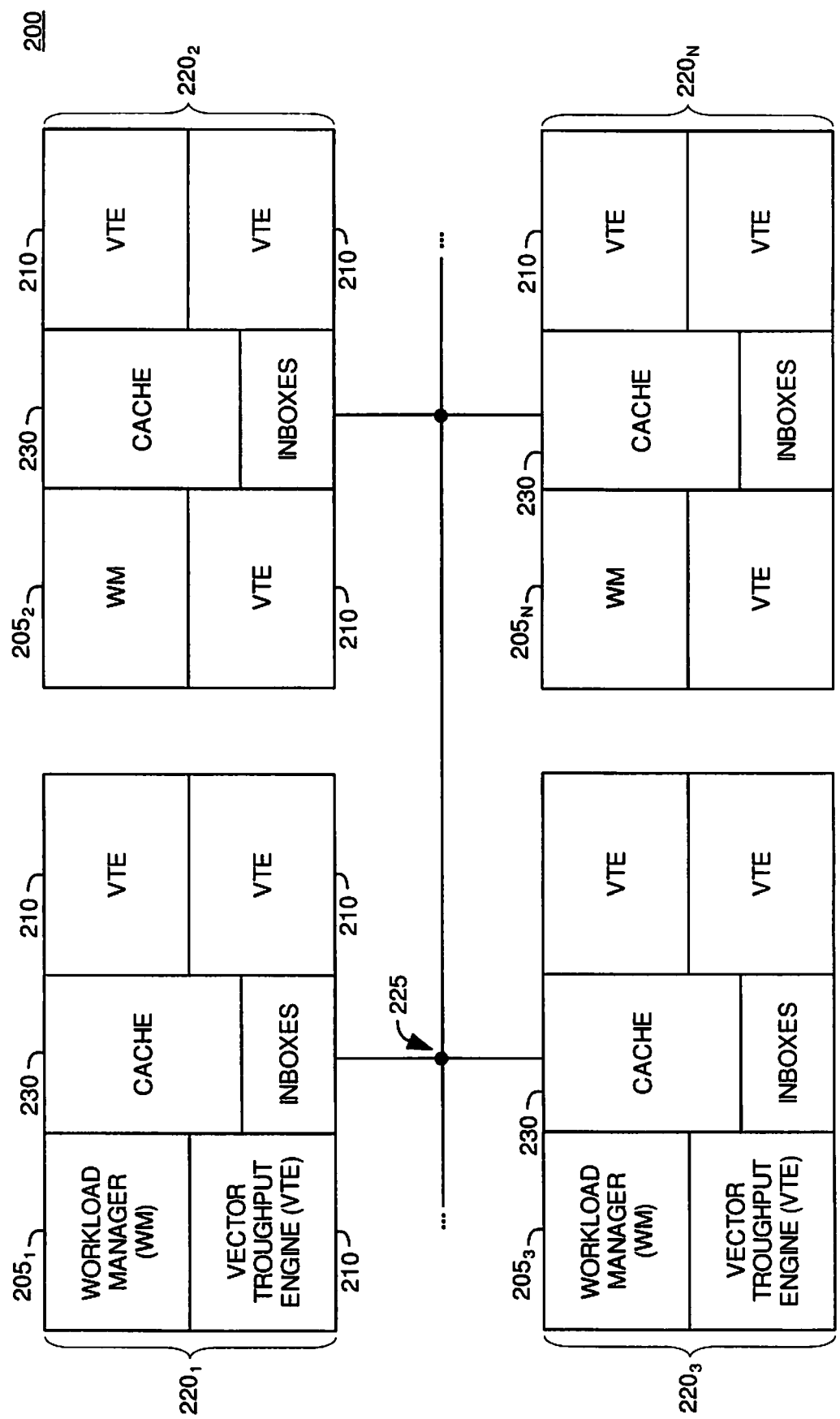
FIGS. 2 and 10 illustrate multiple core processing element networks, according to embodiments of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each multiple core processing element $220_{1-N}$ in the network of multiple core processing elements 200 may also contain a plurality of vector throughput engines 210, according to one embodiment of the invention.

The workload managers $205_{1-N}$ may use a high speed bus 225 to communicate with other workload managers $205_{1-N}$ and/or vector throughput engines 210 of other multiple core processing elements $220_{1-N}$, according to one embodiment of the invention. Each of the vector throughput engines 210 may use the high speed bus 225 to communicate with other vector throughput engines 210 or the workload managers $205_{1-N}$. The workload manager processors 205 may use the high speed bus 225 to collect and distribute image processing related tasks to other workload managers $205_{1-N}$, and/or distribute tasks to other vector throughput engines 210. The use of a high speed bus 225 may allow the workload managers $205_{1-N}$ to communicate without affecting the caches 230 with data packets related to workload manager communications.

An Exemplary Three Dimensional Scene

Figure 3:
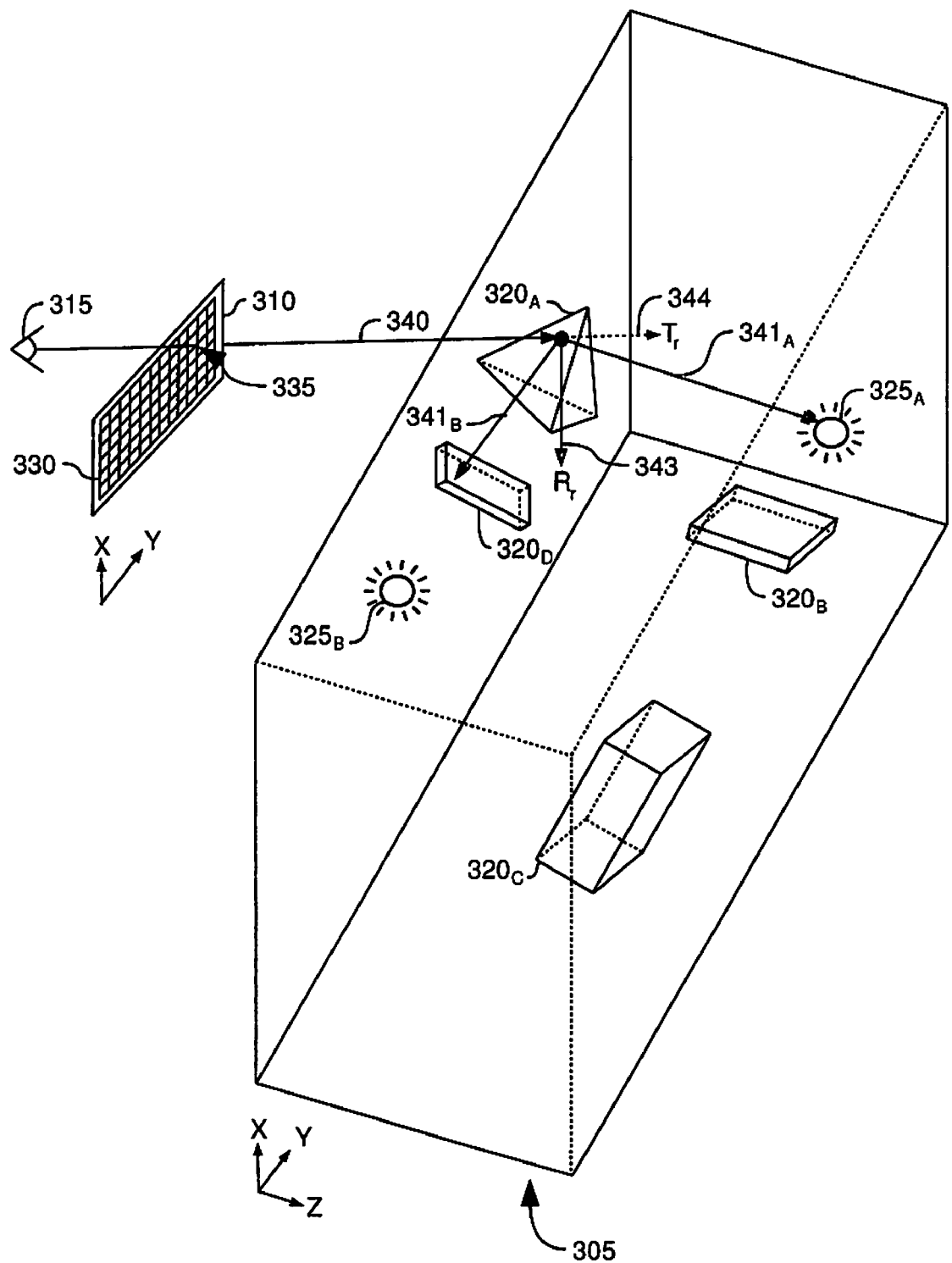
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. The grid 330 may be referred to as a frame. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 305 may strike objects. As the rays strike objects within the scene, the color of the object may be assigned to the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, shadow rays 341 may be issued to determine the contribution of light to the point where the original ray 340 intersected the object. If the object has translucent properties, the image processing system may issue a transmitted ray 344 to determine what color or light to be transmitted through the body of the object. If the object has reflective properties, the image processing system may issue a reflected ray to determine what color or light is reflected onto the object 320.

One type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected onto the object. Reflected rays traverse away from the object at an angle relative to the angle at which the original ray intersected the object. For example, reflected ray 343 may be issued by the image processing system to determine what color or light may be reflected onto the object $320_A$ which the original ray 340 intersected.

The total contribution of color and light of all secondary rays (e.g., shadow rays, transmitted rays, reflected rays, etc.) will result in the final color of the pixel through which the original ray passed.

An Exemplary kd-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume, then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 4A:
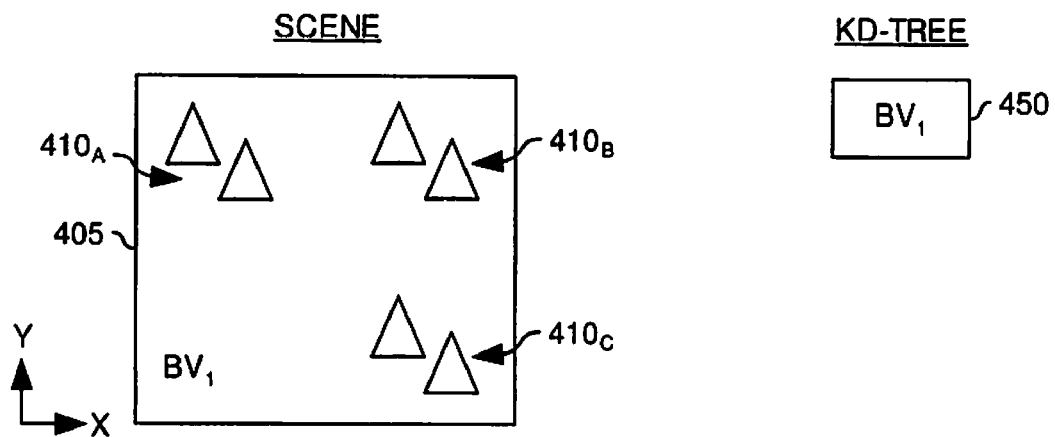
FIGS. 4A-4C illustrate a two dimensional space to be rendered by an image processing system and a corresponding spatial index created by an image processing system, according to one embodiment of the invention.
Figure 4B:
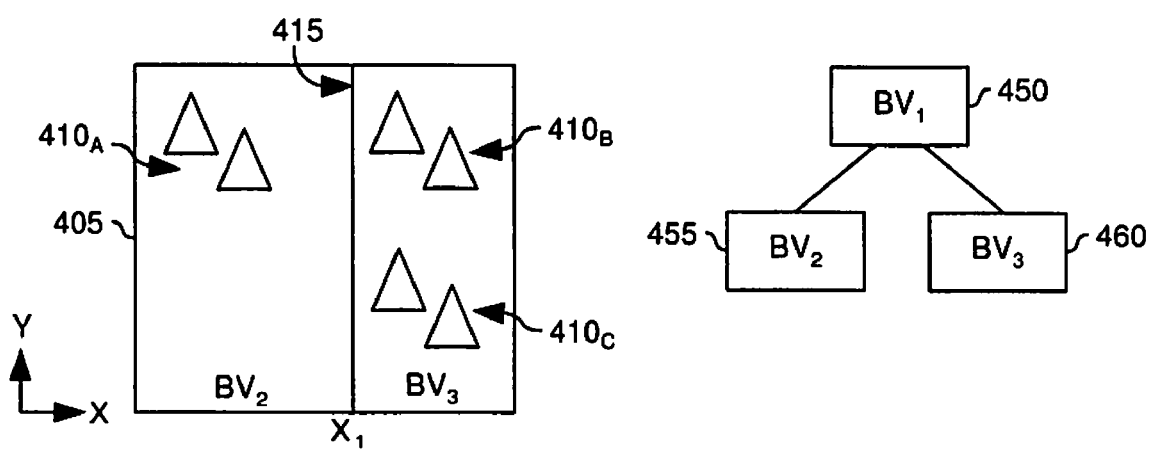
Figure 4C:
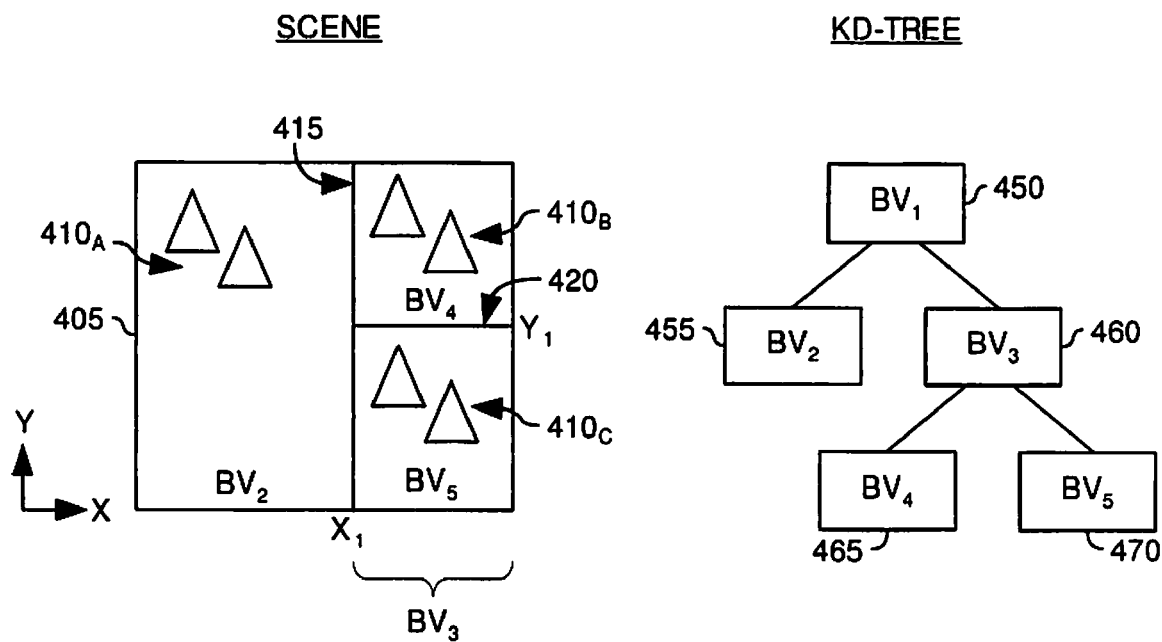

FIGS. 4A-4C illustrate a two dimensional space to be rendered by an image processing system and a corresponding kd-tree. For simplicity, a two dimensional scene is used to illustrate the building of a kd-Tree, however kd-Trees may also be used to represent three dimensional scenes. In the two dimensional illustration of FIGS. 4A-4C splitting lines are illustrated instead of splitting planes, and bounding areas are illustrated instead of bounding volumes as would be used in a three dimensional structure. However, one skilled in the art will quickly recognize that the concepts may easily be applied to a three dimensional scene containing objects.

FIG. 4A illustrates a two dimensional scene 405 containing primitives 410 to be rendered in the final picture to be displayed on a monitor 310. The largest volume which represents the entire volume of the scene is encompassed by bounding volume 1 ($BV_1$). In the corresponding kd-Tree this may be represented by the top level node 450, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 4A, $BV_1$ contains six primitives, therefore kd-Tree construction algorithm may partition $BV_1$ into smaller bounding volumes.

FIG. 4B illustrates the same two dimensional scene 405 as illustrated in FIG. 4A. However, in FIG. 4B the tree construction algorithm has partitioned $BV_1$ into two smaller bounding volumes $BV_2$ and $BV_3$. The partitioning of $BV_1$, was accomplished, by drawing a splitting plane $SP_1$ 415 along the x-axis at point $x_1$. This partitioning of $BV_1$ is also reflected in the kd-Tree as the two nodes 455 and 460, corresponding to $BV_2$ and $BV_3$ respectively, under the internal or parent node $BV_1$ 450. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $410_A$). Nodes which are not partitioned or sub-divided any further, such as $BV_2$, are referred to as leaf nodes.

FIG. 4C illustrates the same two dimensional scene 405 as illustrated in FIG. 4B. However, in FIG. 4C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 465 and 470, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $410_A$, leaf node $BV_4$ may contain pointers to primitives $410_B$, and leaf node $BV_5$ may contain pointers to primitives $410_C$.

A ray tracing image processing system may use the workload manager 205 to traverse the spatial index (kd-Tree). Traversing the kd-Tree may include selecting a branch to a node on a lower level (sub-node) of the kd-Tree to take or proceed to in order to determine if the ray intersects any primitives contained within the sub-node. A workload manager 205 may use the coordinates and trajectory of an issued ray to traverse or navigate through the kd-Tree. By executing ray-bounding volume intersection tests, the workload manager 205 may determine if the ray intersects a plane of the bounding volumes represented by nodes within the kd-Tree structure. If the ray intersects a bounding volume which contains only primitives (i.e., a leaf node), then the workload manager 205 may send the ray and associated information to a vector throughput engine 210 for ray-primitive intersection tests. A ray-primitive intersection test may be executed to determine if the ray intersects the primitives within the bounding volume. This methodology results in fewer ray-primitive intersection tests needed to determine if a ray intersects an object within the scene, in comparison to running ray-primitive intersection tests for a ray against each primitive contained within the scene.

The resulting kd-Tree structure, or other spatial index structure, may be stored in a processor cache 230. The kd-Tree and the size of corresponding data which comprises the kd-Tree may be optimized for storage in a processor cache 230. The storage of the kd-Tree in a processor cache 230 may allow a workload manager 205 to traverse the kd-Tree with a ray that has been issued by the image processing system without having to retrieve the kd-Tree from memory every time a ray is issued by the image processing system.

Multiple Spatial Indexes

Three dimensional scenes may have static and dynamic objects. Static objects may be objects that do not move or change shape over a relatively long period of time (e.g., for several frames). For example, a building may be considered a static object. FIG. 5 illustrates an exemplary building 505 within a three dimensional scene 500. The building 505 in FIG. 5 is a static object because it may not move or change shape over a relatively long period of time.

In contrast, a dynamic object may move or change shape over a relatively short period of time (e.g., over a period of a frame or two). A car may be an example of a dynamic object. For example, FIG. 5 illustrates a car 510 which may move horizontally within the three dimensional scene 500 over a relatively short period of time.

As described previously, an image processing system may use a spatial index (e.g., a kd-tree) to render a two dimensional image (i.e., a frame) from a three dimensional scene. If the scene changes (e.g., objects in the scene move or change shape) the image processing system may have to change or rebuild the spatial index which represents the objects within the three dimensional scene in order to correctly render the next two dimensional image or frame.

If all of the objects within the three dimensional scene are static (i.e., the do not change shape or move) from frame to frame, the spatial index does not have to be rebuilt from frame to frame. However, if the image processing system only uses a single spatial index for ray tracing and some objects within the frame move or change shape from one frame to the next, the spatial index needs to be rebuilt to correctly represent the changes in the objects which make up the scene. For example, when a dynamic object moves from a first position in a first frame to a second position in a second frame, a spatial index which represents the first position of the object in the first frame may not correctly represent the second position of the object in the second frame. Therefore, the spatial index may need to be rebuilt to correctly represent the second position of the object in the second frame.

Rebuilding the entire spatial index by the image processing system may require a considerable amount of processing cycles and thus increasing the overall amount of time required to render a two dimensional image from a three dimensional scene even if only a minimal portion of the three dimensional scene changes. However, according to one embodiment of the invention, two separate spatial indexes may be built in order to reduce the amount of time necessary to respond to changes in position or shape of objects in the three dimensional scene. By reducing the amount of time necessary to respond to changes, the amount of time necessary to render a two dimensional image from a three dimensional scene may be reduced as well.

Figure 6:
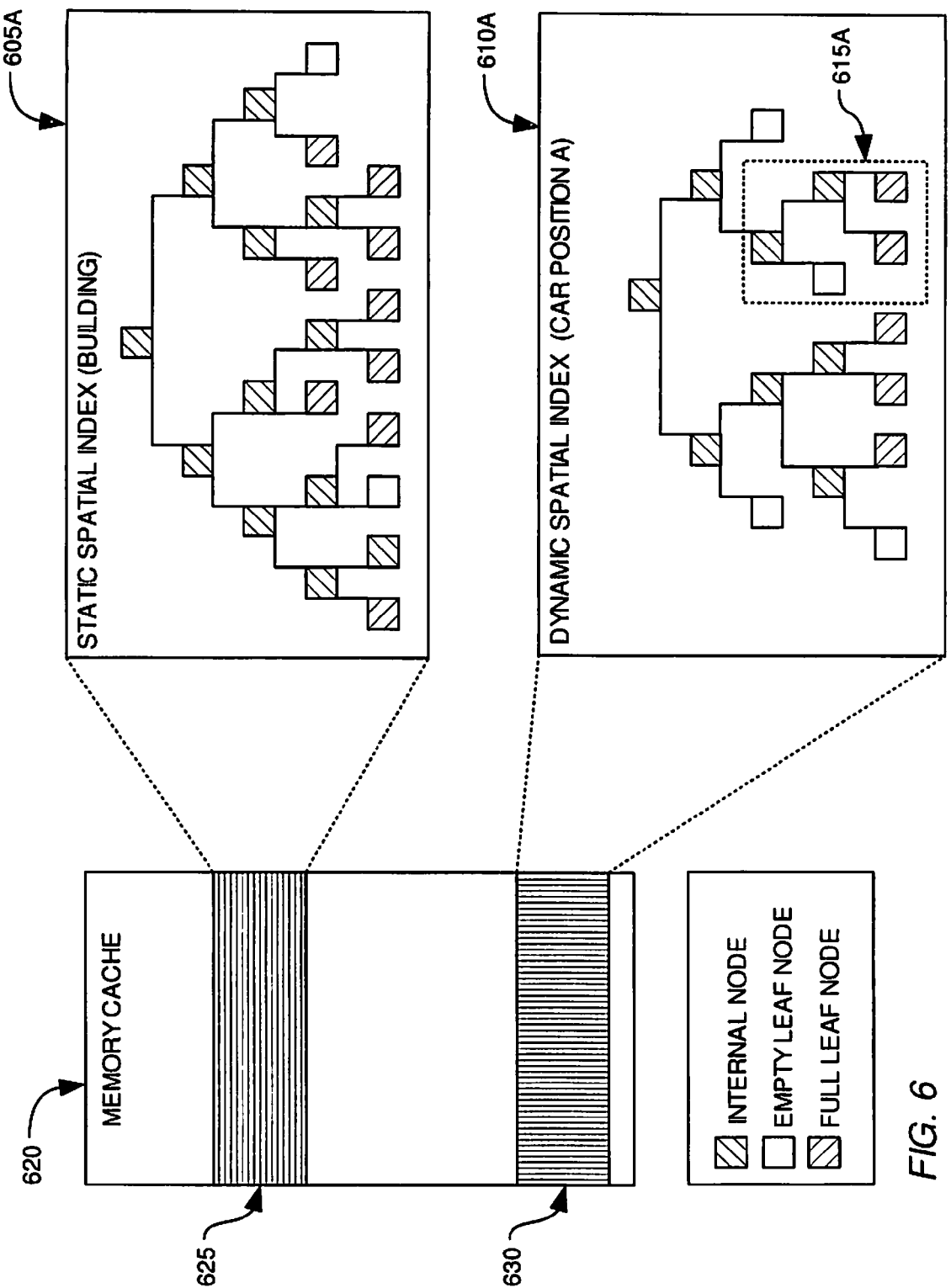
FIGS. 6 and 9 illustrate a memory cache containing a static spatial index and a dynamic spatial index, according to one embodiment of the invention.

FIG. 6 illustrates two separate spatial indexes which together may represent all objects within a three dimensional scene, according to one embodiment of the invention. A first index may be, for example, a static spatial index 605A which may represent all of the static objects within a three dimensional scene. A second spatial index may be, for example, a dynamic spatial index 610A which may represent dynamic objects within a three dimensional scene, according to one embodiment of the invention.

For illustrative purposes, the three dimensional scene to which the static spatial index corresponds may be the three dimensional scene 500 of FIG. 5. Therefore, the static spatial index 605A may represent the static object, the building 505, in the three dimensional scene 500 of FIG. 5. Furthermore, the dynamic spatial index 610A may correspond to the dynamic object (i.e., the car 610) in the three dimensional scene 500 of FIG. 5.

An image processing system using a workload manager 205 to traverse a spatial index may store the spatial index in a memory cache of a processing element (e.g., the memory cache 230 of FIG. 2). Storage of a spatial index in a memory cache may expedite the traversal of a ray through the spatial index by reducing time necessary for a workload manager 205 to access data stored in the spatial index. According to one embodiment of the invention, the static spatial index 605A and the dynamic spatial index 610A may be stored in separate portions of a memory cache. By storing the static spatial index and the dynamic spatial index in separate portions of a memory cache, the dynamic spatial index may be updated without affecting the static spatial index.

FIG. 6 illustrates storing spatial indexes in separate portions of a memory cache 620. For example, the static spatial index 605A may be stored in a first portion 625 of the memory cache 620. The dynamic spatial index 610A may be stored in a second portion 630 of the spatial index.

Figure 7:
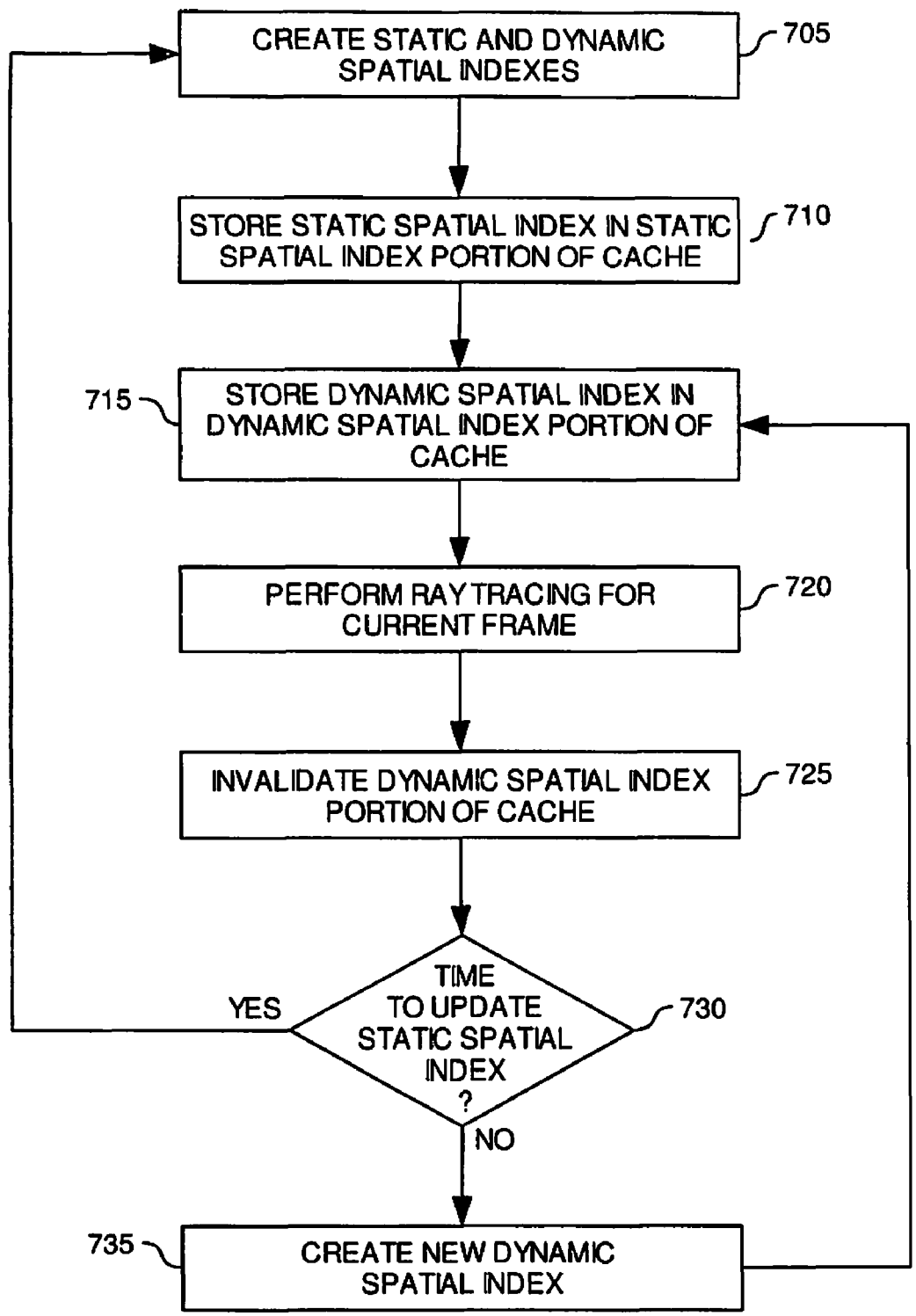
FIG. 7 is a flowchart illustrating a method of creating spatial indexes and managing the storage of the spatial indexes in a memory cache, according to one embodiment of the invention.

FIG. 7 is a flowchart illustrating a method 700 for creating static and dynamic spatial indexes and storing static and dynamic spatial indexes in a memory cache, according to one embodiment of the invention. The method 700 may begin at step 705 where the image processing system may create a static spatial index (e.g., the static spatial index 605A in FIG. 6) which represents static objects within the three dimensional scene. For example, the image processing system may construct a kd-tree as described previously with respect to FIG. 4. Also at step 705 the image processing system may create a dynamic spatial index (e.g., the dynamic spatial index 610A in FIG. 6) which represents all of the dynamic objects within the three dimensional scene. The image processing system, may construct the same type of spatial index as the static spatial index or may construct a different type of spatial index in comparison to the static spatial index. For example, both the static and dynamic spatial indexes may be kd-trees, or the static spatial index may be a kd-tree and the dynamic spatial index may be a bsp-tree.

Next, at step 710 the image processing system may store the static spatial index in a static spatial index portion of a memory cache. For example, the image processing system may store the static spatial index in the first portion 625 of the memory cache 620 illustrated in FIG. 6. After the image processing system is finished storing the static spatial index, the image processing system may proceed to step 715. At step 715, the image processing system may store the dynamic spatial index in a dynamic spatial index portion of the memory cache. For example, the image processing system may store the dynamic spatial index in the second portion 630 of the memory cache 620 illustrated in FIG. 6.

Next at step 720 the image processing system may perform ray tracing for the current frame being rendered. In step 720 a workload manager 205, or workload managers $205_{1-N}$, may use the static spatial index 605A and the dynamic spatial index 610A to trace rays through the three dimensional scene 500. After a workload manager 205 has traversed the ray to a leaf node of either, or both, of the spatial indexes the workload manager may send the ray to a vector throughput engine 210. The vector throughput engine 210 may determine if the ray strikes a primitive contained within the bounding volume corresponding to the traversed to leaf node(s).

The ray may strike a primitive within a bounding volume corresponding to a leaf node of the static spatial index and a primitive within a bounding volume corresponding to a leaf node of the dynamic spatial index. If so, the first intersected primitive will be used to determine the color of the pixel through which the ray passed.

The image processing system may determine which primitive was intersected first, for example, by calculating the distance between a viewpoint (e.g., viewpoint 315 illustrated in FIG. 3) from which the ray originated and a point where the ray intersected a primitive. The primitive which was intersected first may have the shortest distance between the viewpoint and the point at which the ray intersected the primitive.

The image processing system may continue to trace rays through the three dimensional scene until a sufficient number of rays have been traced to render a two dimensional image (i.e., a frame) from the three dimensional scene.

After the image processing system has finished performing ray tracing for the current frame, the image processing system may proceed to step 725. At step 725 the image processing system may invalidate the dynamic portion 630 of the memory cache 620. Invalidation of the dynamic portion 630 of the memory cache 620 may be performed to purge the now obsolete dynamic spatial index from the memory cache 620. The invalidation of the dynamic portion 630 of the memory cache may be performed in anticipation that a new dynamic spatial index may need to be created and saved in the memory cache 620 for the next frame to be rendered by the image processing system. A new dynamic spatial index may need to be created, for example, to reflect new positions of dynamic objects in the next frame to be rendered.

As discussed further below, the invalidation of the dynamic portion of the cache may be accomplished through the use of a distributed time base signal and attributes in a memory directory. The memory cache may be invalidated on a frame to frame basis.

Next at step 730 the image processing system may determine if it is time to update the static spatial index. The image processing system may determine that it is time to update the static spatial index, for example, if objects which were once considered static objects move or change shape and hence need to be considered dynamic objects rather than static objects. Furthermore, it may be time to update the static spatial index, for example, if objects which were once dynamic are no longer moving or changing shape and now may be considered static objects. Although at times the image processing system may determine at step 730 that the static spatial index may need to be updated, the frequency of this determination may be lower than the frequency of the need to update the dynamic spatial index. For example, a new dynamic spatial index may need to be created from frame to frame whereas a static spatial index may only need to be updated after sixty frames have passed.

If it is time to update the static spatial index, the image processing system may return to step 705 where the static and dynamic spatial indexes may be updated to correspond to changes in objects within the three dimensional scene.

However, if it is not time to update the static spatial index the image processing system may proceed to step 735. At step 735 the image processing system may create a new dynamic spatial index which may be used for the next frame to be rendered by the image processing system. The new dynamic spatial index may reflect the new positions or shapes of dynamic objects within the three dimensional scene.

Figure 8:
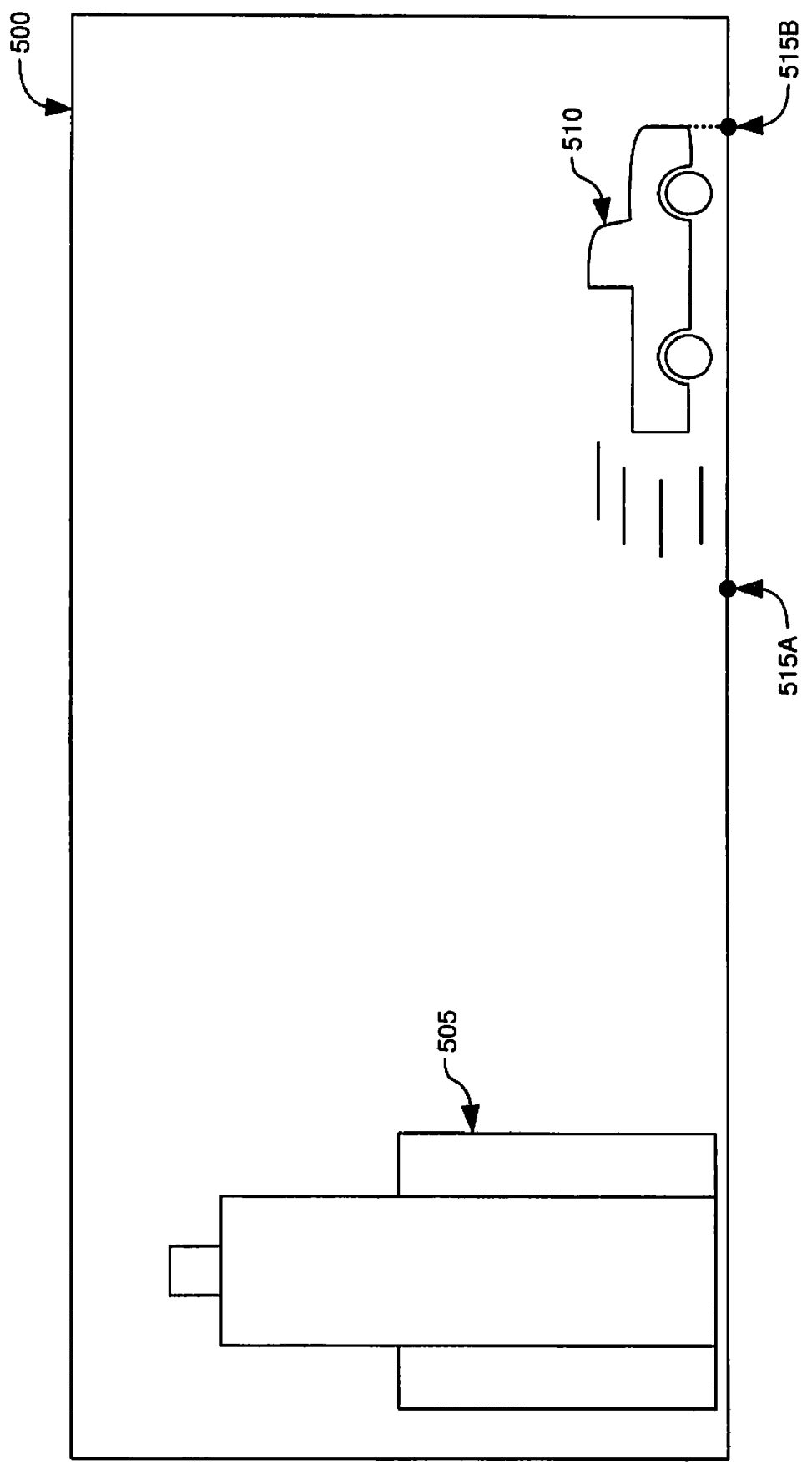

For example, FIG. 8 illustrates the three dimensional scene 500 which was also illustrated in FIG. 5. However, the dynamic object in the three dimensional scene 500 (i.e., the car 510) has moved from a first position 515A in the three dimensional scene 500 to a new position 515B. However, the static object (i.e., the building 505) has remained in the same position. Consequently, in order to properly represent the new three dimensional scene 500 a new dynamic spatial index may be created by the image processing system, according to embodiments of the invention. The new dynamic spatial index may reflect the movement of the dynamic object(s) within the scene (i.e., the car 510). In contrast, according to embodiments of the intervention, since the static objects have not changed position in the three dimensional scene 500, the static spatial index which was created to represent to the static objects present in FIG. 5 correctly represents the static objects present in FIG. 8.

Therefore, instead of rebuilding a single spatial index which represents all objects (i.e., static and dynamic) within the entire three dimensional scene in response to movement of the dynamic objects within the scene, only the dynamic spatial index must be rebuilt to correspond to the movement of objects within the three dimensional scene. Rebuilding a spatial index which only represents a portion of the objects within the three dimensional scene (i.e., the dynamic spatial index) may require less time in contrast to rebuilding a spatial index which represents all of the objects (i.e., dynamic and static).

After the image processing system has created a new dynamic spatial index 610B, the image processing system may return to step 715 where the image processing system may store the new dynamic spatial index 610B in the dynamic spatial index portion 630 of the memory cache 620.

Figure 9:
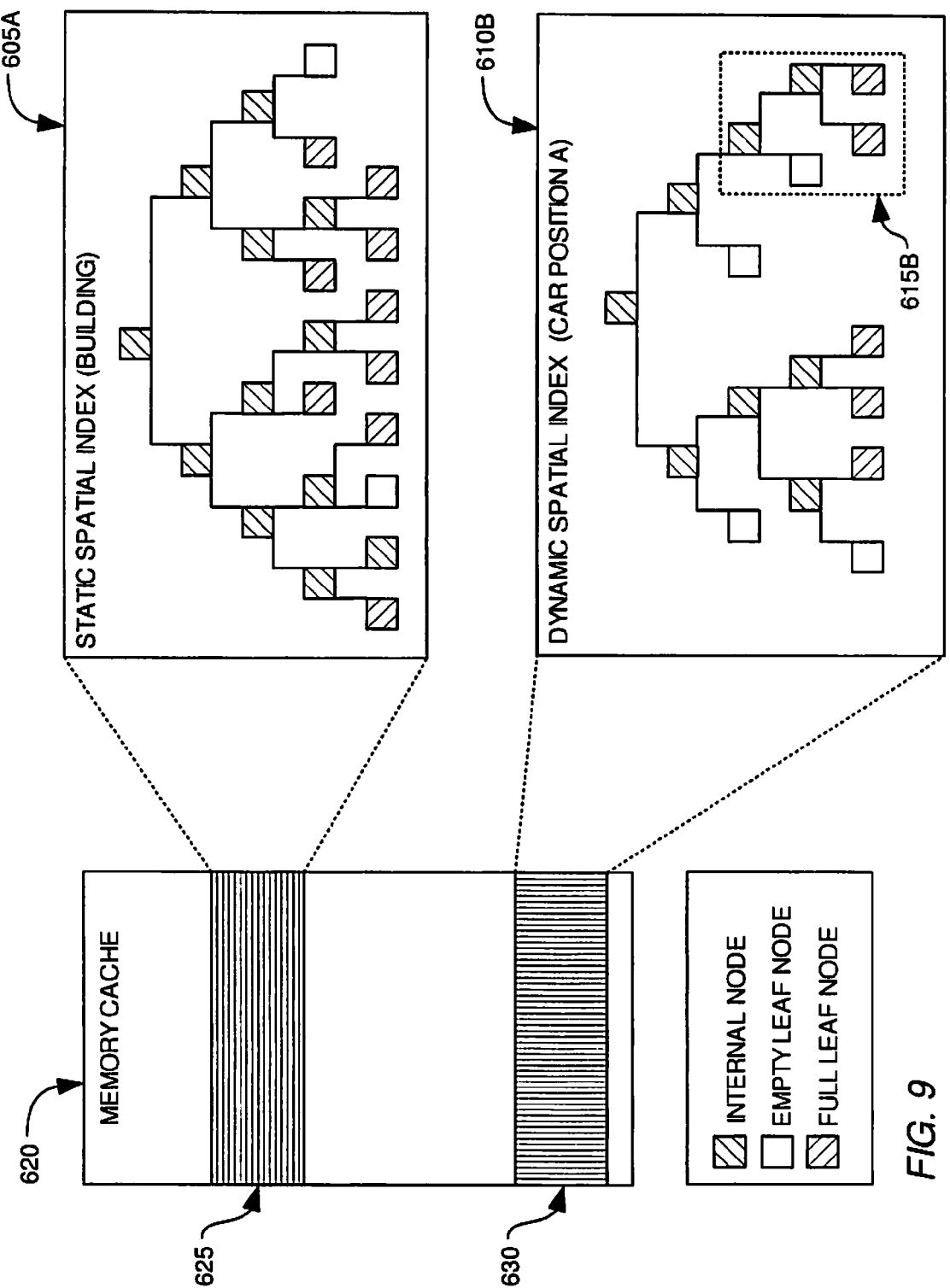

FIG. 9 illustrates the memory cache 620 which was used to store the dynamic and spatial indexes which represented FIG. 5. However, the image processing system has since replaced the dynamic spatial index corresponding to the old position or shape of objects within the three dimensional scene with a new dynamic spatial index. For example, a new dynamic spatial index 610B which may represent the new position 515B of the car 510. The new dynamic spatial index 610B may differ only slightly from the dynamic spatial index 610A which represented the initial position 515A of the car 510. As illustrated in FIG. 9, the difference between the old dynamic spatial index and the new dynamic spatial index is a portion 615B of the dynamic spatial index 610B. This portion 615B of the dynamic spatial index may correspond to the change in position of the car 510B from the first position 515A to the second position 515B.

Also illustrated in FIG. 9 is the static spatial index 605A. The static spatial index 605A has not changed from FIG. 6 to FIG. 9 because the static object (i.e., the building 505) has not changed position or shape in the three dimensional scene 500.

Dynamic Cache Invalidation with Data Dependent Expiration

According to embodiments of the invention and as described above, a memory cache in an image processing system may contain both a dynamic spatial index and a static spatial index. Furthermore, the memory cache may have a dynamic portion where the dynamic spatial index is stored and a static portion where the static spatial index is stored. In some circumstances, it may be desirable to store the dynamic spatial index and static spatial index separately such that the portion of memory which stores the dynamic spatial index may be periodically invalidated while keeping the static portion of the memory cache valid.

Periodic invalidation of the dynamic portion of the spatial index may be performed in anticipation that a new dynamic spatial index corresponding to new positions of objects (e.g., due to movement or collision) within the three dimensional scene may be used by the image processing system. Consequently, the new dynamic spatial index may be stored in the memory cache. By periodically invalidating only the dynamic portion of the memory cache, the static spatial index remains in the memory cache while the old dynamic spatial index (e.g., representing old positions of objects in the three dimensional scene) may be effectively discarded. Subsequently, the new dynamic spatial index may be stored in the location where the old dynamic spatial index was stored.

According to one embodiment of the invention, the dynamic portion of the memory cache may be invalidated using a combination of a distributed time base signal and attribute bits associated with entries within a memory directory. The distributed time base signal may be distributed to processing elements located within an image processing system thereby allowing synchronous periodic invalidation of dynamic cache portions throughout a multiple core processing element network.

Using the distributed time base signal in conjunction with additional attribute bits to invalidate portions of the memory cache eliminates the need to perform thousands if not millions of cache invalidate instructions from frame to frame. The elimination of the need to perform these invalidate instructions for each frame, may allow a processing element (or elements) to perform other image processing related tasks and, consequently, may improve the performance of the image processing system.

Figure 10:
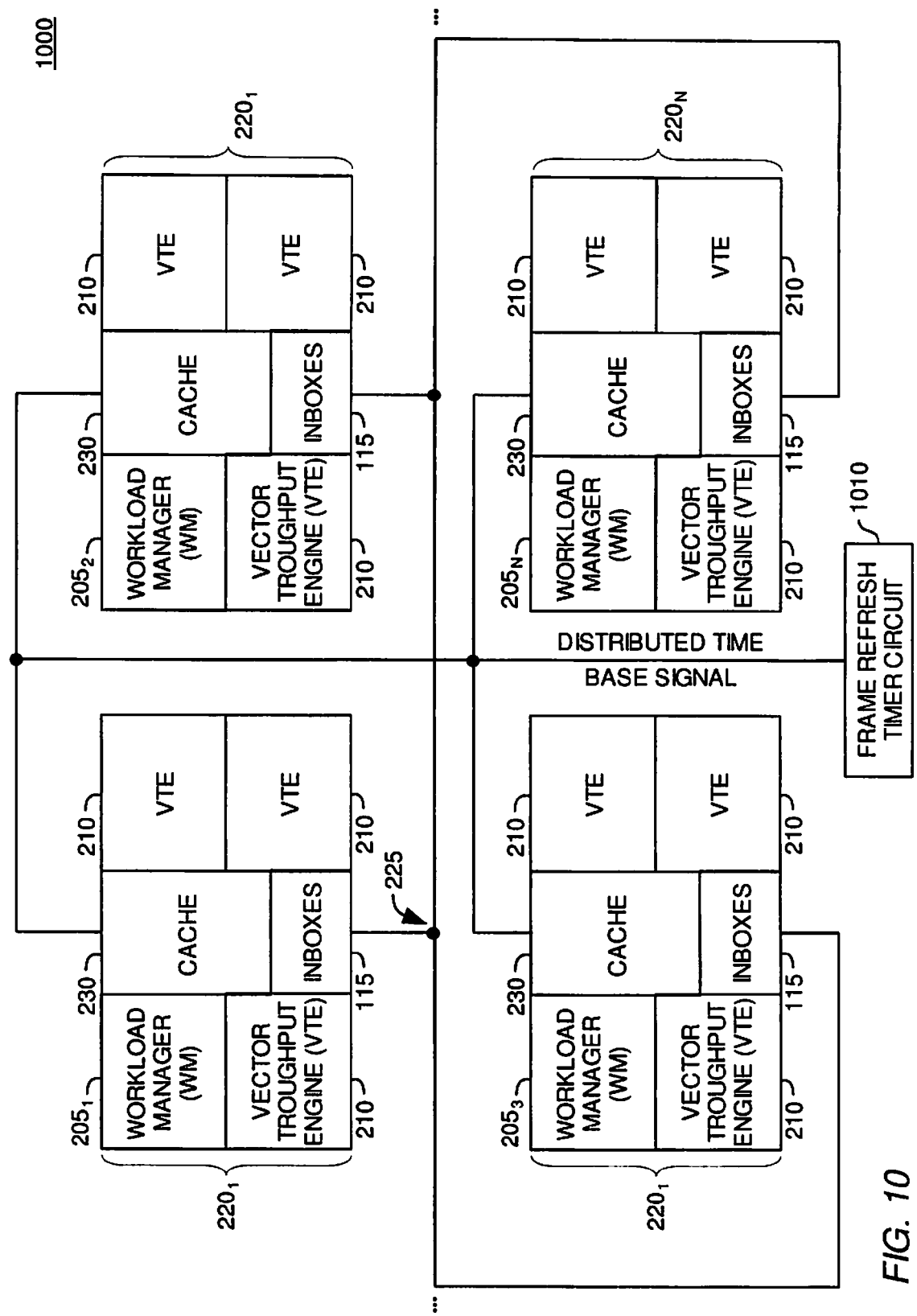

FIG. 10 illustrates a multiple core processing element network 1000 containing a frame refresh timer circuit 1010 which may generate the distributed time base signal, according to one embodiment of the invention. The multiple core processing element network 1000 is similar to the network 200 described above with respect to FIG. 2. However, the multiple core processing element network 1000 illustrated in FIG. 10 also contains the frame refresh timer circuit 1010. According to one embodiment of the invention, the frame refresh timer circuit 1010 may be located on the same chip as the multiple core processing element network 1000. However, according to another embodiment of the invention, the frame refresh timer circuit 1010 may be located on a separate chip than the multiple core processing element network 1000.

The frame refresh timer circuit 1010 may contain circuitry which generates the distributed time base signal, according to one embodiment of the invention. The distributed time base signal may be an electrical pulse which is distributed amongst the multiple core processing elements $220_{1-N}$ in the multiple core processing element network 1000. The circuitry within the frame refresh timer circuit 1010 may be any suitable circuitry to generate the periodic electrical pulse. For example, the circuitry may include a clock oscillator and a transistor whose gate is electrically coupled to the clock oscillator, such that the transistor passes current between its source and drain when the clock oscillator provides a voltage at the gate of the transistor. The generated pulse may be distributed via any suitable electrical connection between the frame refresh timer circuit 1010 and the multiple core processing elements $220_{1-N}$ (e.g., copper wire, trace, etc.).

According to one embodiment of the invention, the period of the distributed time base signal may be determined based on the frame refresh frequency of the image processing system. For example, an image processing system may render or refresh a frame sixty times per second. Before the image processing system renders a new frame, a new dynamic spatial index may be created in order to represent new positions of objects within the three dimensional scene. The new dynamic spatial index may need to be stored within the memory cache. However, the old dynamic spatial index (i.e., used to render the previous frame) may still be stored within the memory cache. The old dynamic spatial index may need to be invalidated such that the image processing system does not use the old positions of objects when rendering a new frame. Therefore, each time the image processing system creates a new dynamic spatial index (e.g., 60 times per second) the old one may need to be invalidated (e.g., 60 times per second).

Consequently, the distributed time base signal period, according to one embodiment of the invention, may be $1/60^{th}$ of a second in order to invalidate the dynamic spatial index portion of the memory cache as needed by the image processing system.

Figure 11:
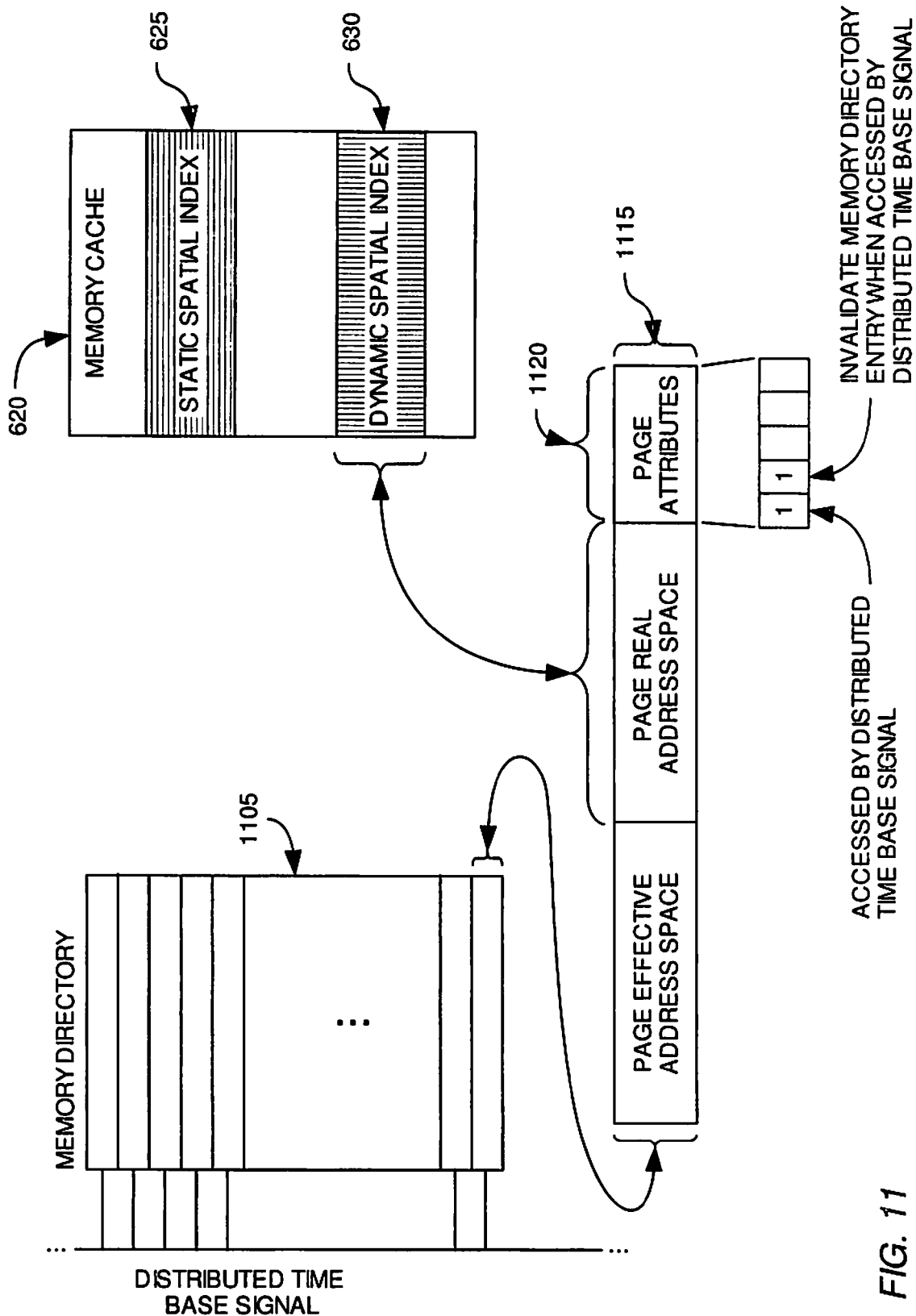
FIG. 11 illustrates a memory directory and a memory cache, according to one embodiment of the invention.

An image processing system which uses virtual address translation may use a memory directory in order to translate/map effective addresses used by the image processing system to real addresses which correspond to memory locations. FIG. 11 illustrates a memory directory 1105 which may be used to map effective addresses to real addresses corresponding to memory locations in the memory cache 620. According to one embodiment of the invention, as illustrated in FIG. 11 the distributed time base signal may be coupled to all of the entries within the memory directory 1105. The distributed time base signal may be used in conjunction with the memory directory to invalidate portions of the memory cache.

As described previously, the memory cache 620 may have a static spatial index portion 625 and a dynamic spatial index portion 630, which store data related to the static spatial index and the dynamic spatial index, respectively. In order to provide access to the data within the dynamic spatial index portion 630 of the memory cache 620, a memory directory entry may be provided. The memory directory entry may map the effective address of the dynamic spatial index portion 630 of the memory cache 620 to the real address of the dynamic spatial index portion 620 of the memory cache 620. For example, memory directory entry 1115 maps the effective address of the dynamic spatial index portion 630 of the memory cache 620 to the real address of the dynamic spatial index portion 630 of the memory cache 620.

In addition to address translation information, the memory directory entries within the memory directory 1105 may contain attribute bits 1120. The attribute bits 1120 may define attributes relating to the data within the memory cache. According to one embodiment of the invention, an attribute bit may be added to the existing attribute bits within the memory directory. The new additional attribute bit may indicate if the memory directory entry 1115 shall become invalid the next time a distributed time base signal is received by the memory directory entry 1115. The additional attribute bit may be known as the invalidate memory directory entry on distributed time base signal bit (inv_on_dtbs). Furthermore, according to one embodiment of the invention, the memory directory entry 1115 may also contain an additional attribute bit which indicates whether the memory directory entry 1115 has been accessed by the distributed time base signal (acc_by_dtbs).

A comparison of the inv_on_dtbs bit and the acc_by_dtbs bit may provide an indication as to whether the memory location within the cache mapped to from the memory directory entry is valid or not. For example, the memory directory entry 1115 illustrated in FIG. 11 has both an acc_by_dtbs bit and an inv_on_dtbs bit. As illustrated in FIG. 11, the memory directory entry 1115 has its inv_on_dtbs bit asserted (e.g., logical '1'). This may indicate that the image processing system wants the data stored within the memory cache (e.g., the dynamic spatial index) which corresponds to the effective address contained within the memory directory entry 1115 invalidated upon the reception of the distributed time base signal.

Furthermore, as illustrated in FIG. 11, the memory directory entry 1115 has its acc_by_dtbs bit asserted (e.g., logical '1'). This may indicate that the memory directory entry 1115 has received the distributed time base signal (i.e., a pulse) from the frame refresh timer circuit 1010. Consequently, the next time a processing element accesses data within the dynamic spatial index portion 630 of the memory cache 620 (i.e., tries to translate an effective address within the range specified by the memory directory entry 1115 corresponding to the dynamic spatial index portion of the memory cache 620) the examination of the acc_by_dtbs bit and the inv_on_dtbs bit may indicate that the memory directory entry is invalid and consequently will cause a cache miss.

The cache miss may cause the processing element to fetch valid data from memory (e.g., system memory) and place the valid data into the memory cache 1110. The fetched data from memory may be, for example, a new dynamic spatial index created by the image processing system for the next frame which is to be rendered.

Therefore, by setting the inv_on_dtbs bit for a particular memory directory entry, the image processing system may specify portions of the memory cache which should be invalidated on a periodic basis. Furthermore, the invalidation frequency is determined by the frequency of the distributed time base signal which may be adjusted (set) to the frame refresh frequency of the image processing system.

Furthermore, the distributed time base signal may be distributed to a plurality of multiple core processing elements (e.g., each multiple core processing element $220_{1-N}$ illustrated in FIG. 10) each having a memory directory and a memory cache. Each of the memory directories within the multiple core processing elements may have attribute bits which indicate that particular portions of the cache (e.g., dynamic spatial index portions 630) be invalidated on the next access by the distributed time base signal. By invalidating portions of each of the memory caches 230, memory coherency between the plurality of multiple core processing elements may be achieved.

For example, each of the multiple core processing elements may be performing tasks related to rendering a single frame from a three dimensional scene. Furthermore, each of the memory caches 230 of the multiple core processing elements $220_{1-N}$ may contain a copy of the same dynamic spatial index. After the frame has been rendered by the image processing system, the memory directory entries corresponding to the dynamic spatial index may be simultaneously invalidated in each of the memory caches 230 through the use of the distributed time base signal. Thereafter, any future attempts to access the portion of any of the memory caches 230 which contains the dynamic spatial index will cause a cache miss and thus require the processing element (e.g., a workload manager $205_{1-N}$) to fetch valid data from memory (e.g., system memory).

The ability to invalidate a portion of a memory cache in contrast to invalidating the entire memory cache (e.g., through a flash invalidate) allows the image processing system to maintain data within the cache from frame to frame (e.g., static spatial index) while invalidating other portions of the cache (e.g., dynamic spatial index).

In addition to the memory directory 1105 which provides address translation, a cache directory may be used in conjunction with a memory cache 620 to map real addresses to entries within the memory cache 620. If cache entries are invalidated within the memory directory 1105 without invalidating the cache entries within the memory cache 620, there is a possibility that old data may remain in the memory cache 620 and be accessed at a later time by the image processing system. The old data may be accessed if it is not replaced by data from main memory (e.g., a new dynamic spatial index) and the image processing system resets the acc_by_dtbs bit in the memory directory entry which provides translation for the address of the old data in the memory cache 620. However, according to one embodiment of the invention, a scrubber function may be used to invalidate the old data within the memory cache 620 in response to the distributed timebase signal.

Figure 12:
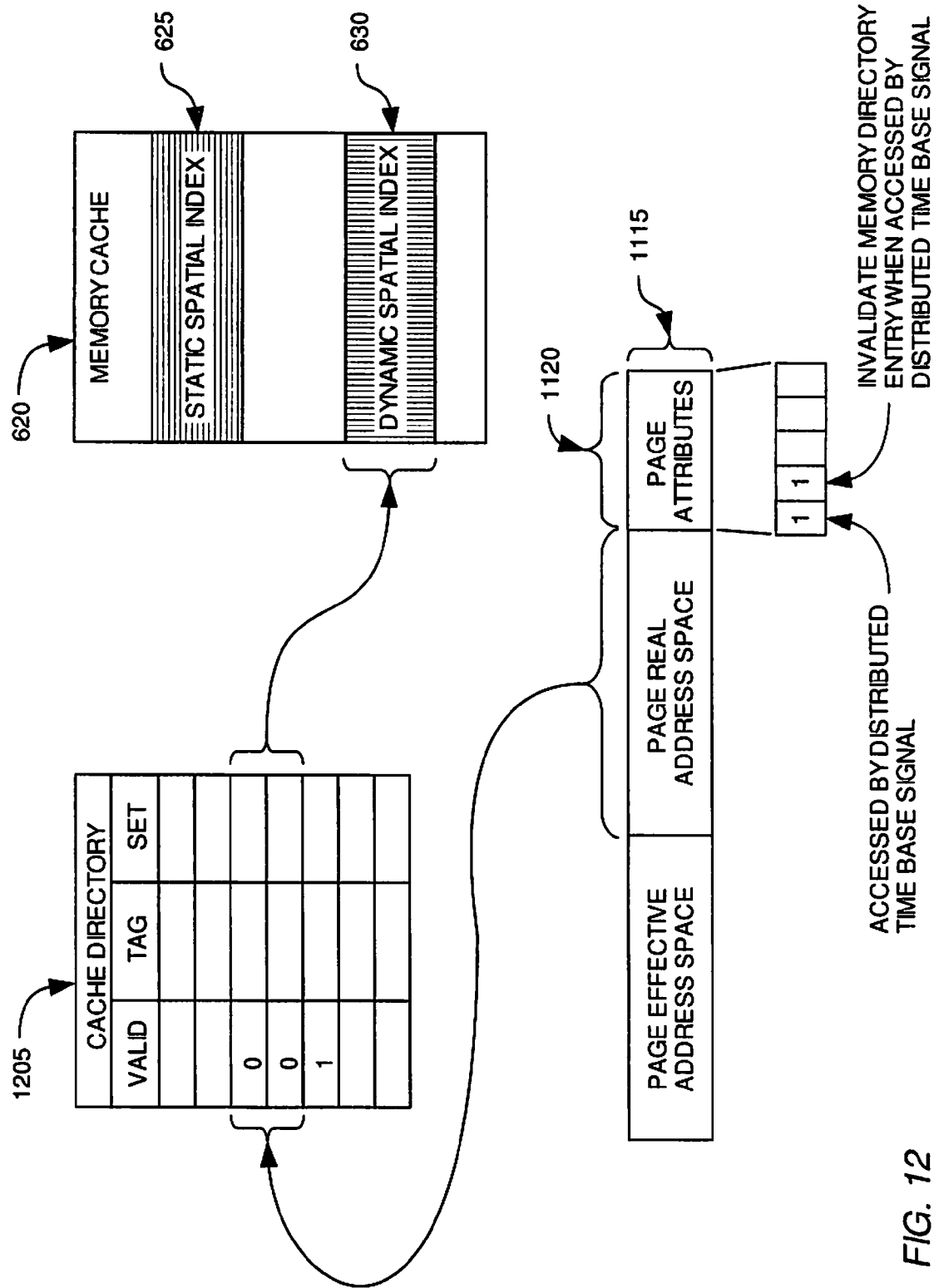
FIG. 12 illustrates a cache directory according to one embodiment of the invention.

For example, FIG. 12 illustrates a cache directory 1205. Each entry within the cache directory 1205 may contain valid bits which indicate that the data within the memory cache 620 which corresponds to the cache directory entry may be valid or invalid. Each cache directory 620 entry may also contain tag bits and set bits used to determine if the memory cache 620 contains an entry (or entries) corresponding to the real address.

According to one embodiment of the invention, the scrubber function may be activated upon the reception of the timebase invalidation signal. Upon activation, the scrubber function may search the memory directory 1105 for entries which have their inv_on_dtbs bit asserted. For each memory directory entry the scrubber function finds which has the inv_on_dtbs bit asserted, the scrubber function may invalidate the corresponding memory cache entry (or entries) by searching the memory cache 620 for entries which match the real address within the memory directory 1105 and setting the corresponding valid bit within the cache directory 1205, for example, to '0'. Consequently, any attempted access to the cache entry that has been invalidated by the scrubber function will cause a cache miss. Thus, by invalidating the old data within the memory cache 620 whose memory directory entry is invalidated by the distributed timebase signal, the scrubber function may ensure that old data within the memory cache 620 is not accessed in the future.

Although the methods and apparatus for invalidating memory cache are herein described with reference to a portion of a memory cache which contains a dynamic spatial index, it should be understood that the invention is not limited to invalidating cache memory areas which only contain dynamic spatial indexes. Instead, any portion of a memory cache containing any type of data, whether related to image processing or not, may be invalidated by the methods and apparatus described herein.

CONCLUSION

According to embodiments of the invention, a distributed time base signal may be coupled to a memory directory which provides address translation for data located within a memory cache. The memory directory may have attribute bits which indicate whether or not the memory entries have been accessed by a distributed time base signal. Furthermore, the memory directory may have attribute bits which indicate whether or not a memory directory entry should be considered invalid after an access to the memory entry by the distributed time base signal. If the memory directory entry has been accessed by the distributed time base signal and the memory directory entry should be considered invalid after the access by the time base signal, any attempted address translation using the memory directory entry may cause a cache miss. The cache miss may initiate the retrieval of valid data from memory.

While the foregoing is directed to embodiments of the present invention, other and further embodiments of the invention may be devised without departing from the basic scope thereof, and the scope thereof is determined by the claims that follow.

What is claimed is:

1. A method of invalidating data in a memory cache, the method comprising:
   creating a first memory directory entry corresponding to a first portion of the memory cache and a second memory directory entry corresponding to a second portion of the memory cache, wherein the memory directory entries provide effective address to real address translation for the data in the memory cache;
   prior to the reception of a distributed time base signal, setting a first bit in the first memory directory entry to indicate the first memory directory entry will be invalid upon the reception of the distributed time base signal;
   generating the distributed time base signal;
   setting a second bit in the first and second memory directory entries in response to the distributed time base signal;
   receiving a request for memory address translation for the first portion of the memory cache; and
   determining the first memory directory entry is invalid by examining the first bit and the second bit in the first memory directory entry.

2. The method of claim 1, further comprising:
   in response to the distributed time base signal, invalidating the first portion of the memory cache;
   updating data in a first memory location corresponding to the first memory directory entry;
   clearing the second bit in the first and second memory directory entries;
   receiving a request for memory address translation for the first portion of the memory cache; and
   determining the first memory directory entry is valid by examining the first bit and the second bit in the first memory directory entry.

3. The method of claim 2, further comprising:
   determining the first portion of the memory cache is invalid;
   retrieving the data from the first memory location; and
   placing the data in the first portion of the memory cache.

4. The method of claim 1, further comprising:
   receiving a request for memory address translation for the second portion of the memory cache; and
   determining the second memory directory entry is valid by examining a first bit of the second memory entry and the second bit of the second memory entry, wherein the first bit of the second memory entry indicates the second memory entry should be considered valid upon the reception of the distributed time base signal.

5. The method of claim 1, wherein the distributed time base signal is generated periodically according to a frame refresh frequency of an image processing system.

6. The method of claim 1, wherein the distributed time base signal is distributed to a plurality of multiple core processing elements each having at least one memory cache.

7. The method of claim 1, wherein a dynamic spatial index is stored in the first portion of the memory cache and a static spatial index is stored in the second portion of the memory cache.

8. A computer storage medium containing a program which, when executed, performs an operation, comprising:
   creating a first memory directory entry corresponding to a first portion of a memory cache and a second memory directory entry corresponding to a second portion of the memory cache, wherein the memory directory entries provide effective address to real address translation for the data in the memory cache;
   prior to the reception of a distributed time base signal, setting a first bit in the first memory directory entry to indicate the first memory directory entry will be invalid upon the reception of the distributed time base signal;
   generating the distributed time base signal;
   setting a second bit in the first and second memory directory entries in response to the distributed time base signal;
   receiving a request for memory address translation for the first portion of the memory cache; and
   determining the first memory directory entry is invalid by examining the first bit and the second bit in the first memory directory entry.

9. The computer readable medium of claim 8, wherein the operation further comprises:
   in response to the distributed time base signal, invalidating the first portion of the memory cache;
   updating data in a first memory location corresponding to the first memory directory entry;

clearing the second bit in the first and second memory directory entries;

receiving a request for memory address translation for the first portion of the memory cache; and determining the first memory directory entry is valid by examining the first bit and the second bit in the first memory directory entry.

10. The computer readable medium of claim 9, wherein the operation further comprises:

determining the first portion of the memory cache is invalid;

retrieving the data from the first memory location; and placing the data in the first portion of the memory cache.

11. The computer readable medium of claim 8, wherein the operation further comprises:

receiving a request for memory address translation for the second portion of the memory cache; and determining the second memory directory entry is valid by examining a first bit of second memory entry and the second bit of the second memory entry, wherein the first bit of the second memory entry indicates the second memory entry should be considered valid upon the reception of the distributed time base signal.

12. The computer readable medium of claim 8, wherein the distributed time base signal is generated periodically according to a frame refresh frequency of an image processing system.

13. The computer readable medium of claim 8, wherein the distributed time base signal is distributed to a plurality of multiple core processing elements each having at least one memory cache.

14. The computer readable medium of claim 8, wherein a dynamic spatial index is stored in the first portion of the memory cache and a static spatial index is stored in the second portion of the memory cache.

15. An image processing system, comprising:

a frame refresh timer circuit coupled to a first processing element, wherein the frame refresh timer circuit is configured to generate a periodic distributed time base signal;

a memory cache comprising at least a first portion and a second portion;

a memory directory comprising at least a first directory entry which provides effective address to real address translation for data within the first portion of the memory cache and a second directory entry which provides effective address to real address translation for data within the second portion of the memory cache; and wherein the processing element is configured to: set an invalidate memory entry on distributed time base signal bit in the first directory entry; set a received distributed time base signal bit in at least the first directory entry and the second directory entry upon a reception of the distributed time base signal; receive a request for memory address translation for data located in the first portion of the memory cache; and determine the first memory directory entry is invalid by comparing the invalidate memory entry on distributed time base signal bit with the received distributed time base signal bit.

16. The image processing system of claim 15 wherein the first processing element is further configured to:

in response to the distributed time base signal, invalidate the first portion of the memory cache;

update data in a first memory location corresponding to the first memory directory entry;

clear the second bit in the first and second memory directory entries;

receive a request for memory address translation for the first portion of the memory cache; and determine the first memory directory entry is valid by examining the first bit and the second bit in the first memory directory entry.

17. The image processing system of claim 16, wherein the first processing element is further configured to:

determine the first portion of the memory cache is invalid;

retrieve the data from the first memory location; and place the data in the first portion of the memory cache.

18. The image processing system of claim 15 wherein the frame refresh timer circuit is further coupled to a second processing element.

19. The image processing system of claim 15, wherein the frame refresh timer circuit is configured to generate the periodic distributed time base signal.

20. The image processing system of claim 15 wherein a dynamic spatial index is stored in the first portion of the memory cache and a static spatial index is stored in the second portion of the memory cache.

* * * * *